July 12, 1938.   W. L. KAUFFMAN, 2D   2,123,852
WRINGER
Original Filed July 19, 1934
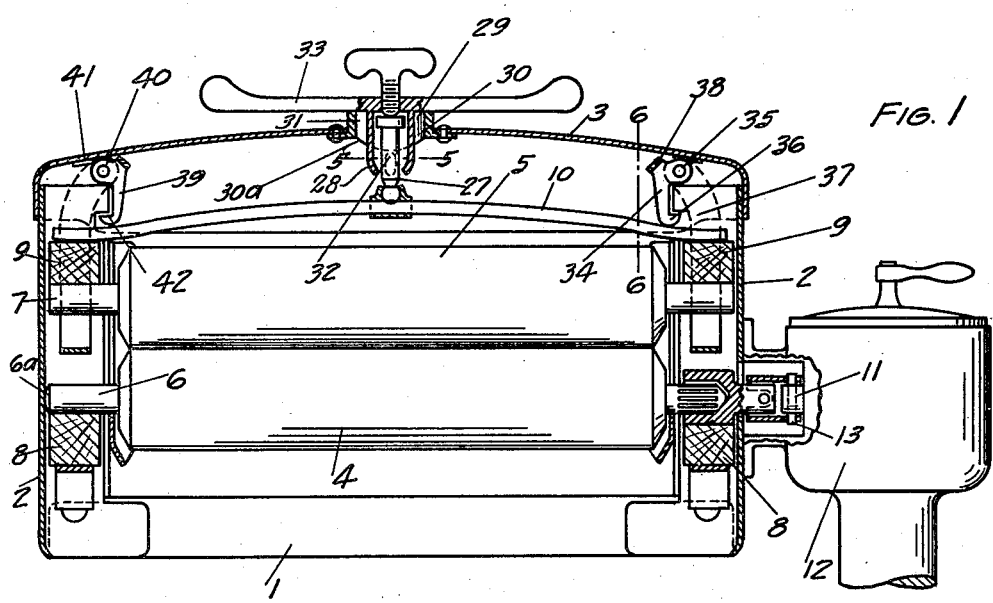
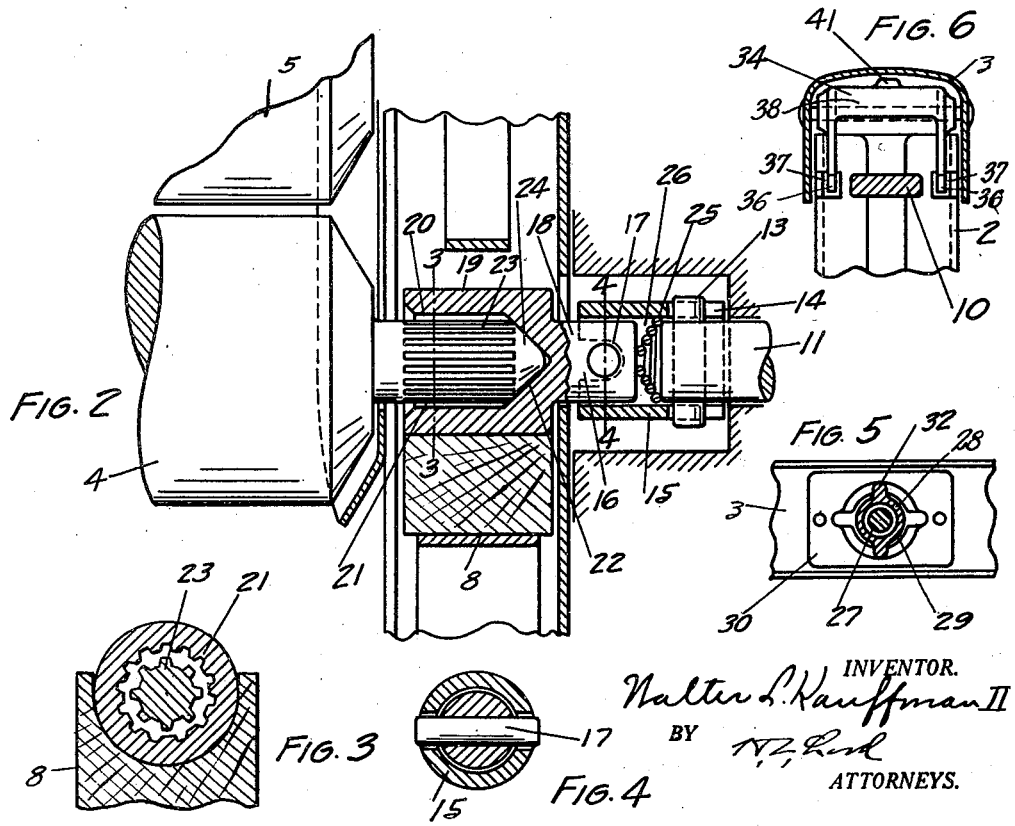
INVENTOR.
Walter L. Kauffman II
BY
ATTORNEYS.

Patented July 12, 1938

2,123,852

UNITED STATES PATENT OFFICE 2,123,852

WRINGER

Walter L. Kauffman, II, Erie, Pa., assignor to Lovell Manufacturing Company, Erie, Pa., a corporation of Pennsylvania Application July 19, 1934, Serial No. 736,009
Renewed December 6, 1937

4 Claims. (Cl. 68—32)

In power wringers it is desirable to stop the rolls on a release of pressure for safety purposes. Heretofore devices have been provided for accomplishing this purpose. The present invention, however, is designed to simplify such mechanisms and increase their efficiency. Features and details of the invention will appear from the specification and claims.

A preferred embodiment of the invention is illustrated in the accompanying drawing as follows:—

Fig. 1 shows a central vertical section of a wringer including the invention.

Fig. 2 an enlarged section of the driving mechanism of the wringer.

Fig. 3 a section on the line 3—3 in Fig. 2.

Fig. 4 a section on the line 4—4 in Fig. 2.

Fig. 5 a section on the line 5—5 in Fig. 1.

Fig. 6 a section on the line 6—6 in Fig. 1.

1 marks the base of the wringer frame, 2 the side stiles, 3 the top bar, 4 the lower roll, 5 the upper roll, 6 the shaft of the lower roll, 7 the shaft of the upper roll, and 8 the bearings for the lower rolls, these bearings being mounted in the stiles, 9 bearings for the upper rolls these bearings being slidingly mounted in the stiles, and 10 a pressure spring for exerting pressure on the rolls.

A shaft 11 forms the means for delivering power to the wringer. This extends from a gear box 12 in the usual manner. The shaft 11 has a cross pin 13 which extends into slots 14 in a connecting sleeve 15. The opposite end of the sleeve has similar slots 16. Trunnions 17 extending from the shank 18 of a fitting 19 extend into the slots 16. Thus the fitting is driven from the shaft 11.

The fitting 19 has a bore 20 and a gear 21 is arranged on the interior surface of this bore. The bore has a conical end 22. A gear 23 is arranged on the end of the shaft 6 and is adapted to mesh with the gear 21. The shaft 6 has a conical end 24, the surfaces of the end 24 corresponding to the taper of the surfaces 22. A spring 25 is arranged in a space 26 in the sleeve 15 and presses against the end of the shaft 11 so that the fitting 19 is yieldingly forced toward the left and the tapered surfaces are yieldingly forced together by this spring. When the rolls are relieved of pressure the spring 25 has sufficient force to force the fitting axially and the surface 22 operating against the surface 24 cams the shaft 6 upwardly and centers it with the fitting 19. In this position the gears 21 and 23 are out of mesh. When normal pressure is exerted on the roll, the downward pressure on the shaft 6 operating through the conical end and the camming action thereof on the surface 22 forces the fitting 19 backwardly against the spring and permits the gear 23 to pass into mesh with the gear 21 so that the wringer roll is driven under normal pressure from the driving means.

A safety release device is preferably provided for instantly releasing pressure when desired. The one here shown is similar to that of the Misner Reissue Patent No. 15,865. A pressure pin 27 is connected with the spring 10 and extends into a stop sleeve 28. The sleeve 28 is journaled in an opening 29 in a fitting 30. The fitting has radial slots 31. Locking shoulders 32 are arranged on the sleeve 28 and when turned into register with the slots 31 pass through these slots, thus relieving pressure on the spring 10. Cams 30a are arranged on the cam of the fitting and a handle 33 is provided for turning the sleeve. The sleeve is forced endwise by the camming action of the cams on the shoulders 32, thus setting pressure on the spring and a slight movement from the neutral position brings the shoulders 32 on the cam surfaces and these cams under pressure rotate the sleeve so as to effect an immediate release. In order that a more definite and further release movement may be provided latches 34 are pivotally secured at the power end of the top bar on pins 35. These latches have hooks 36 adapted to engage notches 37 in the side stiles. A cross bar 38 is arranged in the path of the spring 10 so that when the spring is released the up-throw of the spring hitting the cross bar 38 releases the latch. Preferably the opposite end of the spring is retarded to emphasize this up-throw of the spring, but it is provided with latches 39 pivoted on a pin 40 and limited in movement by an extension 41 so that an upward movement of the top bar swings the latches out of its engaging notches 42 in the stile. This secondary release operates on the same general principle as that of the Schuda Patent No. 1,709,098.

The driving surfaces of the gears 21 and 23 may be sufficiently inclined to assure a break of driving engagement upon the release of pressure on the rolls by reason of the driving torque on such inclined driving surfaces. I prefer, however, to accomplish this as shown by the spring operating through the cam action of the cone 24.

What I claim as new is:—

1. In a wringer, the combination of a frame; rolls mounted in the frame one of the rolls being yieldably mounted; pressure means for the rolls; a shaft for the yieldable roll; a gear on said shaft; a driving means; a gear driven by the driving means, one gear being within the other and one of said gears being on a fitting moving axially; conical engaging surfaces, one for each gear and each conical surface being concentric with its gear; means exerting axial pressure on the fitting exerting camming action on the conical surfaces to release the gears and permitting the meshing of the gears under pressure on the rolls, and means for releasing pressure on the rolls.

2. In a wringer, the combination of a frame; rolls mounted in the frame, one of the rolls being yieldably mounted and having a shaft; a pressure means for the rolls; a gear on said shaft; a fitting having an internal gear adapted to mesh with the gear on the shaft, said fitting having a conical surface concentric therewith and said shaft having a corresponding conical surface concentric therewith; a connection between the fitting and the driving means; yielding means exerting pressure on said conical surfaces adapted to center the shaft and disengage the gears, said yielding means permitting the meshing of the gears through pressure on the rolls, and means for releasing pressure on the rolls.

3. In a wringer, the combination of a frame; rolls mounted in the frame, both of said rolls being movable in the frame transversely to their axes, one of the rolls acting as a pressure roll, and the other as a pressure receiving roll; pressure means for the rolls acting on the pressure roll; a drive shaft for the pressure receiving roll; a gear on said shaft; a driving gear meshing with said gear on the shaft, one gear being within the other and one of said gears being movable axially; conical engaging surfaces, one for each gear, and each conical surface being concentric with its gear; means exerting axial pressure on the axially movable gear exerting camming action on the conical surfaces to release the gears upon the release of pressure on the rolls, and permitting the meshing of the gears under pressure on the rolls through the transverse yielding of the pressure receiving roll, and means for releasing pressure on the rolls.

4. In a wringer, the combination of a frame; rolls mounted in the frame, one of said rolls being yieldingly mounted; pressure means for the rolls; gears driving said rolls, one gear within the other, and one of said gears being movable in response to pressure from the pressure means crosswise of its axis into mesh with its companion gear; a camming mechanism having cam surfaces, one connected with the movable gear and one movable axially of the gear, said axially moving surface yielding under the camming action of the surfaces as the movable gear is pressed into mesh through pressure of the pressure means; resilient means returning the axially moving camming surface upon release of the pressure from the pressure means to move the movable gear out of mesh; means for releasing pressure on the rolls.

WALTER L. KAUFFMAN II.